(12) United States Patent
Plante et al.

(10) Patent No.: US 11,719,247 B2
(45) Date of Patent: Aug. 8, 2023

(54) REVERSE FLOW ENGINE ARCHITECTURE

(71) Applicant: PRATT & WHITNEY CANADA CORP., Longueuil (CA)

(72) Inventors: Ghislain Plante, Verdun (CA); Patrick Valois, Longueuil (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 49 days.

(21) Appl. No.: 17/406,216

(22) Filed: Aug. 19, 2021

(65) Prior Publication Data

US 2021/0381517 A1    Dec. 9, 2021

Related U.S. Application Data

(63) Continuation of application No. 16/717,268, filed on Dec. 17, 2019, now Pat. No. 11,125,239, which is a
(Continued)

(51) Int. Cl.
*F02C 3/14* (2006.01)
*F02C 7/36* (2006.01)
(Continued)

(52) U.S. Cl.
CPC ............. *F04D 25/045* (2013.01); *F01D 5/06* (2013.01); *F01D 9/02* (2013.01); *F01D 15/12* (2013.01); *F02C 3/145* (2013.01); *F02C 6/206* (2013.01); *F02C 7/143* (2013.01); *F02C 7/36* (2013.01); *F02K 3/06* (2013.01); *F04D 19/02* (2013.01);
(Continued)

(58) Field of Classification Search
CPC .... F02C 3/145; F02C 3/10; F02C 7/36; F02K 3/06
See application file for complete search history.

(56) References Cited

U.S. PATENT DOCUMENTS 2,704,434 A * 3/1955 Schmitt .................... F02K 3/12
60/761
3,152,443 A    10/1964 Newland
(Continued)

FOREIGN PATENT DOCUMENTS

EP    3032068      6/2016
GB    2117052 A  * 10/1983  ............. F02C 3/145
(Continued)

OTHER PUBLICATIONS

Machine Translation of WO02081883A2 Retrieved from: Espacenet. (Year: 2002).*
(Continued)

*Primary Examiner* — Eric J Zamora Alvarez
*Assistant Examiner* — Wesley Le Fisher
(74) *Attorney, Agent, or Firm* — Norton Rose Fulbright Canada LLP

(57) ABSTRACT

A reverse flow gas turbine engine has a low pressure (LP) spool and a high pressure (HP) spool arranged sequentially in an axial direction. The LP spool comprises an LP compressor disposed forward of an LP turbine and drivingly connected thereto via an LP compressor gear train. The HP spool comprises an HP compressor in flow communication with the LP compressor, and an HP turbine disposed forward of the HP compressor and drivingly connected thereto via an HP shaft.

8 Claims, 3 Drawing Sheets

Related U.S. Application Data continuation of application No. 15/384,655, filed on Dec. 20, 2016, now Pat. No. 10,533,559.

(51) Int. Cl.

| | | |
|---|---|---|
| *F04D 25/04* | (2006.01) | |
| *F04D 19/02* | (2006.01) | |
| *F04D 29/053* | (2006.01) | |
| *F04D 27/00* | (2006.01) | |
| *F04D 29/32* | (2006.01) | |
| *F01D 5/06* | (2006.01) | |
| *F01D 15/12* | (2006.01) | |
| *F04D 29/58* | (2006.01) | |
| *F01D 9/02* | (2006.01) | |
| *F02C 7/143* | (2006.01) | |
| *F02K 3/06* | (2006.01) | |
| *F02C 6/20* | (2006.01) | |
| *F02C 7/32* | (2006.01) | |

(52) U.S. Cl.
CPC ......... *F04D 27/009* (2013.01); *F04D 29/053* (2013.01); *F04D 29/321* (2013.01); *F04D 29/582* (2013.01); *F02C 7/32* (2013.01); *F05D 2220/32* (2013.01); *F05D 2230/60* (2013.01); *F05D 2240/60* (2013.01); *F05D 2250/312* (2013.01); *F05D 2250/313* (2013.01); *F05D 2260/213* (2013.01); *F05D 2260/40311* (2013.01); *Y02T 50/60* (2013.01)

(56) References Cited

U.S. PATENT DOCUMENTS

| | | | |
|---|---|---|---|
| 4,829,763 A | 5/1989 | Rao | |
| 5,201,796 A | 4/1993 | Glinski et al. | |
| 6,082,967 A * | 7/2000 | Loisy | F02C 7/36 |
| | | | 416/129 |
| 6,865,891 B2 | 3/2005 | Walsh et al. | |
| 7,237,378 B2 * | 7/2007 | Lardellier | F02K 3/06 |
| | | | 60/264 |
| 8,935,912 B2 * | 1/2015 | Norris | F02C 7/36 |
| | | | 60/773 |
| 9,222,409 B2 * | 12/2015 | Kupratis | F02C 6/02 |
| 9,410,441 B2 * | 8/2016 | Macfarlane | F01D 25/246 |
| 9,890,704 B2 | 2/2018 | Speak et al. | |
| 9,945,259 B2 * | 4/2018 | Cigal | F01D 25/18 |
| 2005/0060983 A1 | 3/2005 | Lardellier | |
| 2012/0167591 A1 | 7/2012 | Drachsler et al. | |
| 2012/0272656 A1 | 11/2012 | Norris | |
| 2013/0111923 A1 | 5/2013 | Donnelly et al. | |
| 2013/0205752 A1 | 8/2013 | Suciu et al. | |
| 2014/0290265 A1 | 10/2014 | Ullyott et al. | |
| 2016/0146104 A1 | 5/2016 | Penda et al. | |
| 2016/0363055 A1 | 12/2016 | Edwards | |
| 2017/0191381 A1 | 7/2017 | Baba et al. | |
| 2017/0306841 A1 * | 10/2017 | Skertic | F02C 3/073 |
| 2017/0363098 A1 * | 12/2017 | Taylor | F02C 7/32 |
| 2017/0369179 A1 * | 12/2017 | Bradbrook | F02C 3/04 |
| 2017/0370284 A1 * | 12/2017 | Harvey | F02C 3/145 |

FOREIGN PATENT DOCUMENTS

| | | | | |
|---|---|---|---|---|
| WO | WO-02081883 A2 * | 10/2002 | | F02C 3/045 |
| WO | 2017198999 | 11/2017 | | |

OTHER PUBLICATIONS

A New Approach to Turboshaft Engine Growth, M.A. Compagnon, General Eleclıic Company, Lynn, MA, pp. 30-41-1 to 80-41-6, May 13, 1980.

* cited by examiner

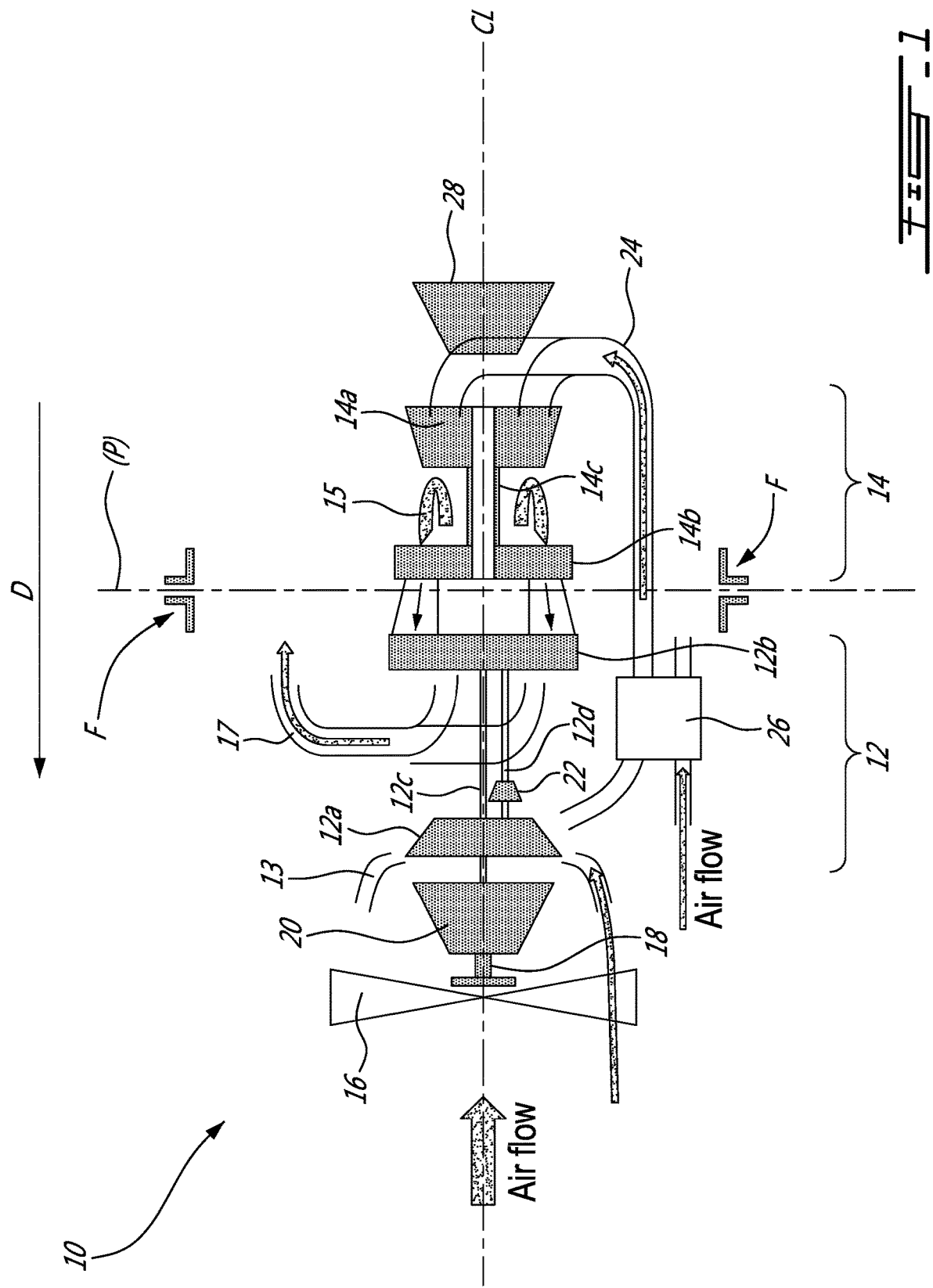

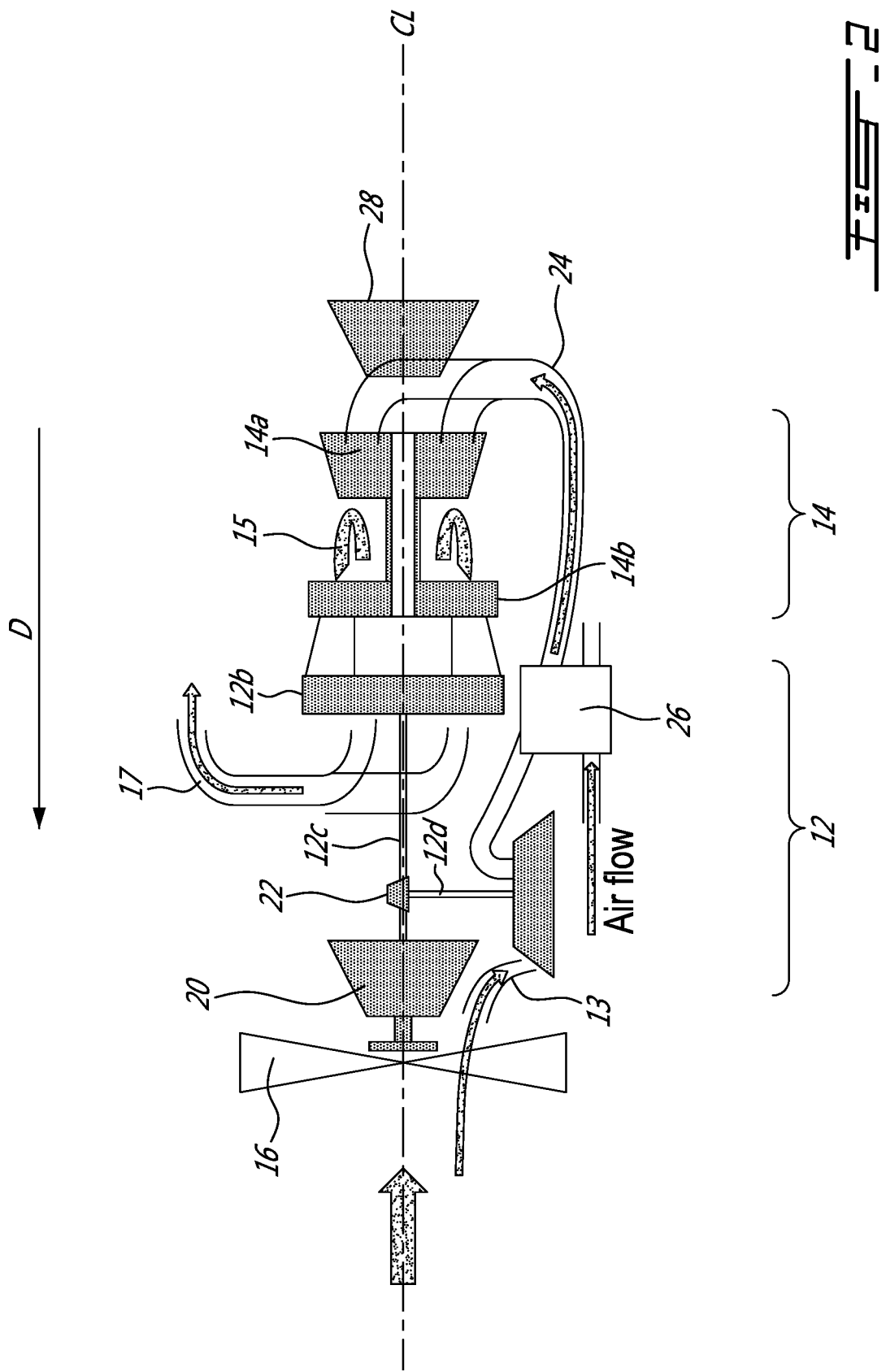

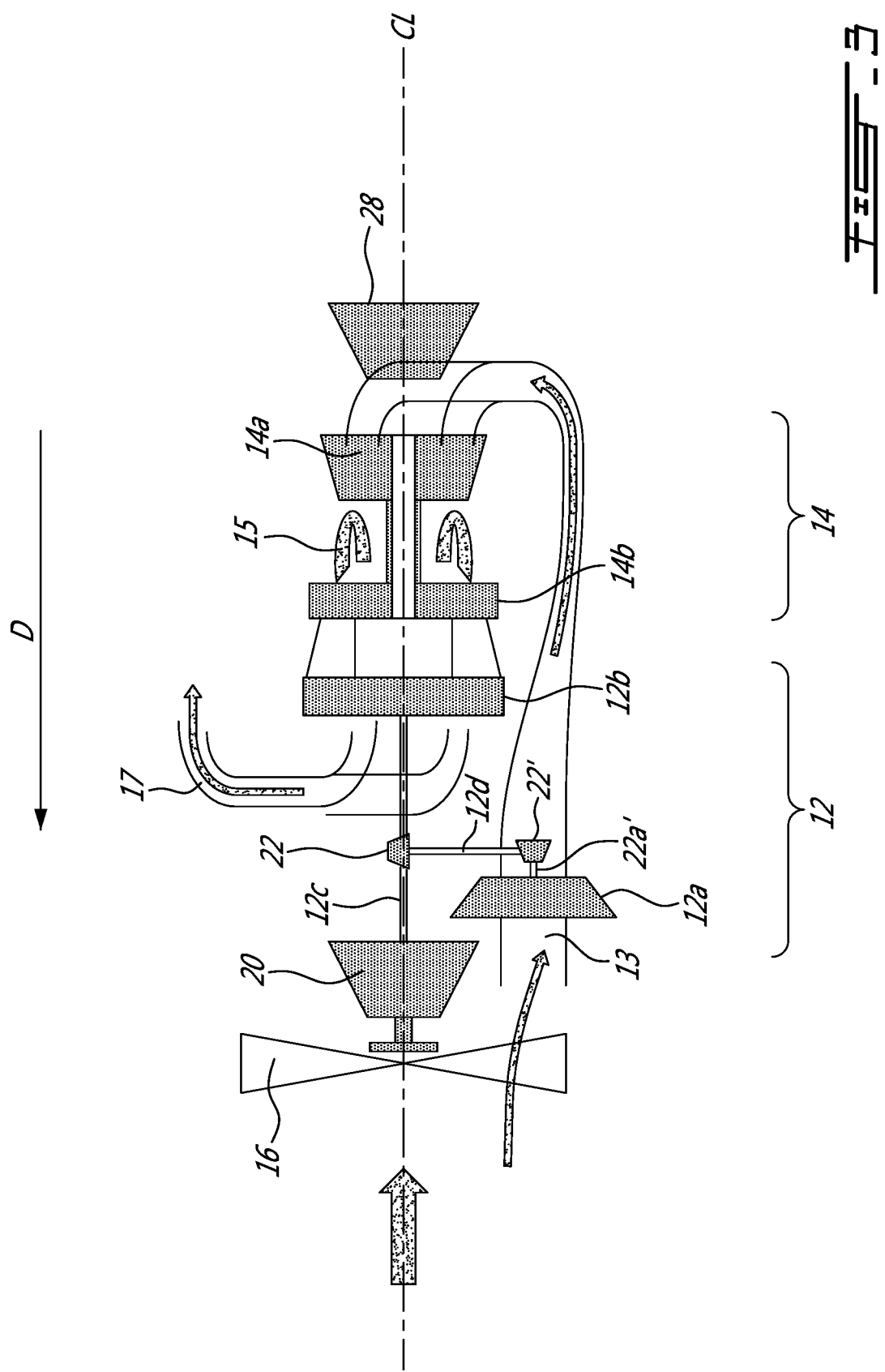

REVERSE FLOW ENGINE ARCHITECTURE

CROSS-REFERENCE TO RELATED APPLICATIONS

This application is a continuation of U.S. application Ser. No. 16/717,268 filed Dec. 17, 2019 which is a continuation of U.S. application Ser. No. 15/384,655 filed Dec. 20, 2016, now U.S. Pat. No. 10,533,559, issued Jan. 14, 2020, the entire contents of which are incorporated by reference herein.

TECHNICAL FIELD

The application relates generally to gas turbine engines and, more particularly, to a multi-spool engine architecture.

BACKGROUND OF THE ART

Many gas turbine engine architectures with multiple stages have a low pressure compressor, high pressure compressor, high pressure turbine and low pressure turbine arranged sequentially in this order along the engine axial direction. The low pressure compressor at a first end of the engine is drivingly connected to the low pressure turbine at the opposed end of the engine via a low pressure shaft extending concentrically through a hollow high pressure shaft, which, in turn, drivingly connects the high pressure turbine to the high pressure compressor.

For reasons, such as maintainability and reparability, it is generally desirable to have an engine architecture that allows for simple engine disassembly. However, in some instances, concentric shaft arrangements such as the one described above may complicate the engine disassembly procedures.

There is, thus, a need for improvement.

SUMMARY

In one aspect, there is provided a reverse flow gas turbine engine comprising: a low pressure (LP) spool and a high pressure (HP) spool arranged sequentially in an axial direction, the LP spool comprising an LP compressor drivingly connected to an LP turbine via an LP compressor gear train; the HP spool comprising an HP compressor in flow communication with the LP compressor, and an HP turbine disposed forward of the HP compressor and aft of the LP turbine, the HP turbine being drivingly connected to the HP compressor via an HP shaft.

In another aspect, there is provided a reverse flow gas turbine engine comprising: a low pressure (LP) spool and a high pressure (HP) spool arranged sequentially in an axial direction, the LP spool comprising an LP turbine drivingly connected to an LP turbine shaft adapted to be connected to a load, an LP compressor non-coaxially mounted with respect to the LP turbine, and an LP compressor shaft drivingly connecting the LP turbine to the LP compressor, the LP compressor shaft extending at an angle with respect to the LP turbine shaft; the HP spool comprising an HP compressor in flow communication with the LP compressor, an HP turbine disposed forward of the HP compressor and aft of the LP turbine, and an HP shaft drivingly connecting the HP turbine to the HP compressor.

DESCRIPTION OF THE DRAWINGS

Reference is now made to the accompanying figures in which:

FIG. 1 is a schematic cross-sectional view of a gas turbine engine according to an embodiment of the present disclosure;

FIG. 2 is a schematic cross-sectional view of a gas turbine engine illustrating a first variant;

FIG. 3 is a schematic cross-sectional view of a gas turbine engine illustrating a second possible variant.

DETAILED DESCRIPTION

FIG. 1 illustrates a first example of a multi-spool gas turbine engine 10 of a type preferably provided for use in subsonic flight, and generally comprising multiple spools which perform compression to pressurize atmospheric air received through an air inlet 13, and which extract energy from combustion gases before they exit the engine via an exhaust outlet 17. The term "spool" is herein intended to broadly refer to drivingly connected turbine and compressor rotors and is, thus, not limited to a compressor and turbine assembly on a single shaft. As will be seen hereinbelow, it also includes a rotary assembly with multiple shafts geared together. The illustrative embodiment shown in FIG. 1 comprises a low pressure (LP) spool module 12 and a high pressure (HP) spool module 14 arranged sequentially along a longitudinal axis of the engine 10. The LP spool module 12 is detachably mounted to the HP spool module 14 by a flange assembly (F), thereby allowing the engine to be readily axially split at a split plane (P) in the turbine section of the engine. This contributes to facilitating maintenance operations, such as hot engine inspections and on the wing maintenance operations for wing mounted aircraft engines.

The LP spool module 12 generally comprises a casing (not shown) surrounding an LP spool. The LP spool generally comprises an LP compressor 12a for pressurizing air received from the air inlet 13 and an LP turbine 12b for extracting energy from combustion gases discharged from a combustor 15 in which compressed air is mixed with fuel and ignited for generating an annular stream of hot combustion gases. According to one aspect of the embodiment shown in FIG. 1, the LP compressor 12a and the LP turbine 12b are coaxially mounted for rotation about a common axis, which may be in-line with the engine centerline.

The LP turbine 12b is also known as the power turbine. The LP turbine 12b may drive two or more rotatable loads. According to the illustrated embodiment, the first load is a propeller 16, which provides thrust for flight and taxiing in aircraft applications. However, it is understood that the first load could be any suitable component, or any combination of suitable components, that is capable of receiving a rotational drive from the LP turbine 12b. For instance, in an alternate embodiment where the engine 10 is a turboshaft instead of a turboprop as depicted in FIG. 1, the first load could include helicopter main rotor(s) and/or tail rotor(s), pump(s), generator(s), gas compressor(s), marine propeller(s), etc.

In the embodiment shown in FIG. 1, the first load (i.e. the propeller 16) is drivingly coupled to an output shaft 18 extending axially from an output end of a reduction gearbox (RGB) 20. The input end of the RGB 20 is mechanically coupled to an LP turbine shaft 12c drivingly connected to the LP turbine 12b. As shown in FIG. 1, the LP turbine shaft 12c may extend axially centrally through the LP compressor 12a and coaxially relative to the engine centerline. The RGB 20 processes and outputs the rotational drive transferred thereto from the LP turbine 12*b* via the LP turbine shaft 12*c* through known gear reduction techniques. The RGB 20 allows for the propeller 16 to be driven at its optimal rotational speed, which is different from the rotational speed of the LP turbine 12*b*.

Still referring to FIG. 1, the second load driven by the LP turbine 12*b* is the LP compressor 12*a*. According to one aspect of the illustrated embodiment, the LP compressor 12*a* is drivingly connected to the LP turbine 12*b* via an LP compressor gear train 22, thereby allowing the LP compressor 12*a* to run at a different rotational speed from the LP turbine 12*b*. This provides more flexibility in the selection of design points for the LP compressor 12*a*. The input end of the LP compressor gear train 22 is drivingly connected to an LP compressor drive shaft 12*d*, which is, in turn, drivingly connected to the LP turbine 12*b*. As shown in FIG. 1, the LP compressor drive shaft 12*d* may extend axially between the LP turbine 12*b* and the LP compressor 12*a* in parallel to the LP turbine shaft 12*c* and the engine central axis. While in the embodiment illustrated in FIG. 1, the LP compressor drive shaft 12*d* is distinct from the LP turbine shaft 12*c*, it is understood that the two shafts could be unitary. Also, other loads/offtakes could be coupled to the LP spool, on the LP turbine shaft 12*c* or LP compressor shaft 12*d*.

The HP spool module 14 generally comprises a casing (not shown) surrounding an HP spool. The HP spool comprises an HP compressor 14*a* connected in flow communication with the LP compressor 12*a* for receiving pressurized air therefrom via an external duct line 24. The duct line 24 is disposed outside of the engine core to minimize heat transfer from the combustion gases flowing through the turbine section of the engine. The duct line 24 extends from a front end of the engine to a rear end thereof in order to direct the air from the LP compressor 12*a* to the HP compressor 14*a*. A heat exchanger 26, such as an air-to-air cooler, can be provided in external line 24 to cool down the pressurized air fed to the HP compressor 14*a*. This may allow improving the engine specific fuel consumption (SFC) by maintaining the air pressure while lowering the gas temperature (enthalpy reduction at constant pressure). Still referring to FIG. 1, it can be appreciated that the HP spool further comprises an HP turbine 14*b* immediately downstream of the combustor 15. The HP turbine 14*b* is drivingly connected to the HP compressor 14*a* via an HP shaft 14*c*. The HP shaft 14*c* may be coaxial to the engine centerline. The HP spool may be drivingly connected to an accessory gear box (AGB) 28 coaxially mounted at the rear end of the engine 10 for providing drive outputs to various accessories (e.g. fuel pump, starter-generator, oil pump, scavenge pump, etc.). For instance, the HP shaft 14*c* may be extended axially beyond the HP compressor 14*a* to provide a drive input to the AGB 28.

In operation, the LP compressor 12*a* pressurizes the air received from air inlet 13. The air is then directed from the LP compressor 12*a* to the HP compressor 14*a* via duct line 24. As the air travels through line 24 it is cooled down by heat exchanger 26 (when such a heat exchanger is provided). The HP compressor 14*a* further pressurized the air before the compressed air be mixed with fuel and ignited in the combustor 15. The combustion gases discharged from the combustor 15 flow through the various stages of the HP turbine 14*b* where energy is extracted to drive the HP compressor 14*a* and the RGB 28. The combustion gases flow from the HP turbine 14*b* to the LP turbine 12*b* where further energy is extracted from the combustion gases by the LP turbine 12*b* to drive the LP compressor 12*a* and the propeller 16. The combustion gases are then discharged from the engine 10 via exhaust 17.

It can be appreciated that during operation of the engine 10, the LP compressor 12*a* driven by the LP turbine 12*b* feeds pressurized air to the HP compressor 14*a*. Therefore, the pressurized air flow produced by the LP compressor 12*a* is provided to the HP compressor 14*a* and contributes to the work of both the LP turbine 12*b* and the HP turbine 14*b*.

It can thus be appreciated that the presence of the above-described LP and HP spools provides the engine 10 with a "split compressor" arrangement. More particularly, some of the work required to compress the incoming air is transferred from the HP compressor 14*a* to the LP compressor 12*a*. In other words, some of the compression work is transferred from the HP turbine 14*b* to the more efficient LP turbine 12*b*. This transfer of work may contribute to higher pressure ratios while maintaining a relatively small number of rotors. In a particular embodiment, higher pressure ratios allow for higher power to weight ratio, better engine specific fuel consumption (SFC), and a lower turbine inlet temperature (sometimes referred to as "T4") for a given power. These factors can contribute to a lower overall weight for the engine 10. The transfer of compression work from the HP compressor 14*a* to the LP compressor 12*a* contrasts with some conventional reverse-flow engines, in which the high pressure compressor (and thus the high pressure turbine) perform all of the compression work.

The engine 10 may be referred to as a "reverse-flow" engine because gases flow through the HP compressor 14*a* and the turbine section of the engine 10 in a rear-to-front direction. This is in contrast to "through-flow" gas turbine engines in which gases flow through the core of the engine from a front portion to a rear portion. The direction of the flow of gases through the engine 10 disclosed herein can be better appreciated by considering that the gases flow through the turbine section in the same direction D as the one along which the engine 10 travels during flight. Stated differently, gases flow through the engine 10 from a rear end thereof towards the propeller 16.

It will thus be appreciated that the expressions "forward" and "aft" used herein refer to the relative disposition of components of the engine 10, in correspondence to the "forward" and "aft" directions of the engine 10 and aircraft including the engine 10 as defined with respect to the direction of travel. In the embodiment shown, a component of the engine 10 that is "forward" of another component is arranged within the engine 10 such that it is located closer to the propeller 16. Similarly, a component of the engine 10 that is "aft" of another component is arranged within the engine 10 such that it is further away from the propeller 16.

In view of the foregoing, it can also be appreciated that the LP compressor 12*a* is disposed forward of the LP turbine 12*b*. In contrast, the HP turbine 14*a* is disposed aft of the HP turbine 14*b*. In this way the LP and HP turbines 12*b*, 14*b* can be disposed immediately adjacent to one another with no concentric HP and LP shafts extending therebetween. Such an axial disposition of the HP and LP spool components eliminates the need for a concentric shaft arrangement to interconnect LP spool components disposed on axially opposite ends of an HP spool as in conventional turboprop and turboshaft engines with split compressor engine architectures. That is all the LP spool components may be grouped together as one module disposed forward of the HP spool components. This in combination with the flange assembly (F) allows for the provision of the engine split plane (P) between the LP and HP turbines 12*b*, 14*b*. Such a modular approach facilitates engine disassembly and, thus, access to the engine internal components for inspection purposes and the like. Indeed, by having both the LP compressor 12a and the LP turbine 12b forward of the HP spool, the low pressure spool can be readily removed from the engine 10. One has simply to disconnect the duct line 24 between the LP compressor 12a and the HP compressor 14a and to open the flange assembly (F) between the LP and HP turbines 12b,14b.

Referring now to FIGS. 2 and 3, it can be appreciated that the LP compressor 12a can be non-coaxially disposed with respect to the LP turbine 12b and the propeller 16, which according to the illustrated embodiments are coaxial to the engine centerline CL. This may provide for a more direct air feed to the LP compressor 12a, which may be advantageous from an aerodynamic point of view depending on the type of compressor used. Also, this configuration allows reducing the engine axial length. From FIGS. 2 and 3, it can be appreciated that the air inlet may be provided in a frontal plane of the engine, which provides for direct air feed as opposed to an air inlet which is provided on an outer circumferential surface of the engine as shown in FIG. 1. Depending on the compressor type (centrifugal or axial), the inlet design could be optimized to reduce flow distortion or uneven pressure distribution. It is typical to see longer inlet duct to assure good flow characteristic for a compressor in-line with the main engine axis.

In the embodiment of FIG. 2, the rotation axis of the LP compressor 12a is perpendicular to the rotation axis of the LP turbine 12b and the propeller 16. Indeed, the LP compressor drive shaft 12d is set at right angles to the LP turbine shaft 12c. The LP compressor shaft 12c is drivingly connected to the output end of the LP compressor gear train 22. The LP turbine shaft 12c is, in turn, drivingly connected to the input end of the LP compressor gear train 22. The LP compressor 12a is offset from the engine centerline CL by a distance corresponding to a length of the LP compressor shaft 12d. The LP compressor gear train 22 may include a bevel gear arrangement to drivingly interconnect the LP turbine shaft 12c and the LP compressor shaft 12d. It is understood that the shafts 12c, 12d could be set at various angles, the illustrated right angle shaft arrangement being only one example.

FIG. 3 is another example in which the LP compressor shaft 12d branches-off at an angle (e.g. 90 degrees) from the LP turbine shaft 12c in a manner similar to an AGB tower shaft. Again the LP compressor 12a is offset from the LP turbine shaft 12c (which lies on the engine centerline CL in the illustrated embodiment) by an offset distance corresponding to the length of the LP compressor shaft 12d. However, according to this embodiment a second set of gears 22' is provided at a distal end of the LP compressor shaft 12d to allow the LP compressor 12a to be disposed so as to rotate about an axis parallel to the engine centerline CL. The second set of gears 22' may include an output shaft 22a' having a rotation axis parallel to the engine centerline CL. The output shaft 22a' is suitably drivingly connected to the LP compressor 12a. In this example, the air axially enters and axially exits the LP compressor 12a, thereby minimizing pressure losses due to flow direction changes.

It can thus be appreciated that at least some of the embodiments of the engine disclosed herein provide a mechanical architecture of turbomachinery that allows for a split compressor system and easy disassembly of the engine between the LP turbine and the HP turbine. Such a split compressor reverse-flow engine with axially sequentially disposed LP and HP spools may be used for aircraft nose installations, as well as for wing installations. It can also be used for industrial applications. This engine architecture also allows for a geared LP compressor which is advantageous from an aerodynamic point of view. Having a geared LP compressor packaged in a LP spool module adapted to be mounted forwardly of a HP spool module contributes to the operability of the engine. Performance gains might also result from a leaner mechanical arrangement, i.e. less parasitic losses associated to support bearings and transfer gears.

The above description is meant to be exemplary only, and one skilled in the art will recognize that changes may be made to the embodiments described without departing from the scope of the present disclosure. Any modifications which fall within the scope of the present invention will be apparent to those skilled in the art, in light of a review of this disclosure, and such modifications are intended to fall within the appended claims.

The invention claimed is:

1. A reverse flow turboprop engine comprising:
a propeller;
a reduction gearbox (RGB) having an output drivingly connected to the propeller;
an engine core comprising a low pressure (LP) spool module and a high pressure (HP) spool module arranged sequentially in an axial direction along an engine centerline,
the LP spool module comprising:
an LP compressor and an LP turbine, the LP compressor disposed forward of the LP turbine and aft of the RGB relative to a travel direction of the engine, the LP turbine drivingly connected to both an input of the RGB and the LP compressor, the LP spool module further comprising an LP shaft projecting axially forwardly from the LP turbine along the engine centerline;
the HP spool module comprising:
an HP compressor in flow communication with the LP compressor via an external duct disposed outside of the engine core, and an HP turbine disposed forward of the HP compressor and aft of the LP turbine, the HP turbine drivingly connected to the HP compressor, the HP spool module further comprising an HP shaft extending axially along the engine centerline between the HP turbine and the HP compressor;
the LP spool module and the HP spool module axially disposed on opposed sides of an engine split plane P extending between the LP turbine and the HP turbine, the split plane P including a flange assembly for allowing the engine to be split between the LP turbine and the HP turbine; and
an accessory gearbox (AGB) mounted in-line along the engine centerline aft of the HP compressor,
wherein the LP shaft and the HP shaft are axially spaced-apart by an axial gap extending through the split plane P, and wherein the LP spool module further comprises an LP compressor shaft extending axially between the LP turbine and the LP compressor, the LP compressor shaft radially offset from the LP shaft and the engine centerline.

2. The reverse flow turboprop engine defined in claim 1, wherein the LP compressor is offset from the engine centerline.

3. The reverse flow turboprop engine defined in claim 1, wherein the LP turbine is drivingly connected to the LP compressor via a gear train, the gear train disposed aft of the LP compressor and offset relative to the engine centerline.

4. The reverse flow turboprop engine defined in claim 1, wherein both the LP compressor shaft and the LP shaft are fully spaced forwardly from the split plane P.

5. The reverse flow turboprop engine defined in claim 1, wherein the HP shaft is spaced aft from the split plane P.

6. The reverse flow turboprop engine defined in claim 1, wherein the external duct extends from a forward end of the engine to a location aft of the HP compressor and forward of the AGB at an aft end of the engine.

7. The reverse flow turboprop engine defined in claim 1, wherein the LP compressor shaft is disposed entirely forward of the HP shaft.

8. The reverse flow gas turbine engine defined in claim 1, wherein an air cooler is connected to the external duct between an outlet of the LP compressor and an inlet of the HP compressor.

\* \* \* \* \*